United States Patent [19]

Schliebe

[11] 4,105,721
[45] Aug. 8, 1978

[54] VENTURI FITTING FOR THE AERATION OF WATER

[76] Inventor: Rae D. Schliebe, 34 Diamond Dr., Livermore, Calif. 94550

[21] Appl. No.: 586,952

[22] Filed: Jun. 16, 1975

[51] Int. Cl.² .................................................. B01F 3/04
[52] U.S. Cl. .......................................... 261/76; 138/44
[58] Field of Search ................... 261/76, 77, DIG. 24, 261/DIG. 39, DIG. 75; 138/44

[56] References Cited

U.S. PATENT DOCUMENTS

| | | | |
|---|---|---|---|
| 1,922,920 | 8/1933 | Aherne | 261/76 X |
| 2,088,624 | 8/1937 | Tschudy | 261/DIG. 75 X |
| 2,090,719 | 8/1937 | Alt | 138/44 X |
| 2,423,801 | 7/1947 | Sloan | 138/44 X |
| 2,676,470 | 4/1954 | Streitz | 138/44 X |
| 3,146,195 | 8/1964 | Berardi | 261/77 X |

FOREIGN PATENT DOCUMENTS 174,560  1/1935  Switzerland .............................. 261/77

Primary Examiner—William A. Cuchlinski, Jr.
Attorney, Agent, or Firm—Jack M. Wiseman

[57] ABSTRACT

Fittings for the recirculation system of a pool in which a Venturi T-fitting has an air inlet connector. Water entering the inlet end of the T-fitting advances through an adapter, which is in threaded engagement with a Venturi insert formed with a discharge orifice. The insert is formed with a nut-like projection. The water entering the adapter is discharged through the discharge orifice of the Venturi insert as it is mixed with air under pressure so as to be aerated. The aerated water is discharged from the Venturi T-fitting for passage through an inlet fitting for the recirculation of water in a pool. For regulating the size of the discharge orifice, the Venturi insert is removably replaced.

5 Claims, 8 Drawing Figures

U.S. Patent  Aug. 8, 1978  4,105,721
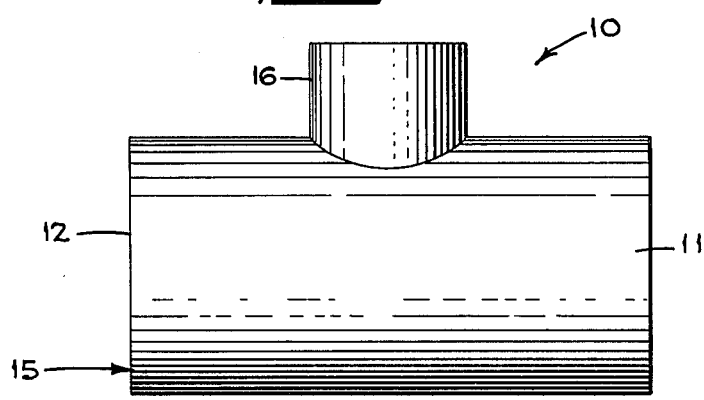
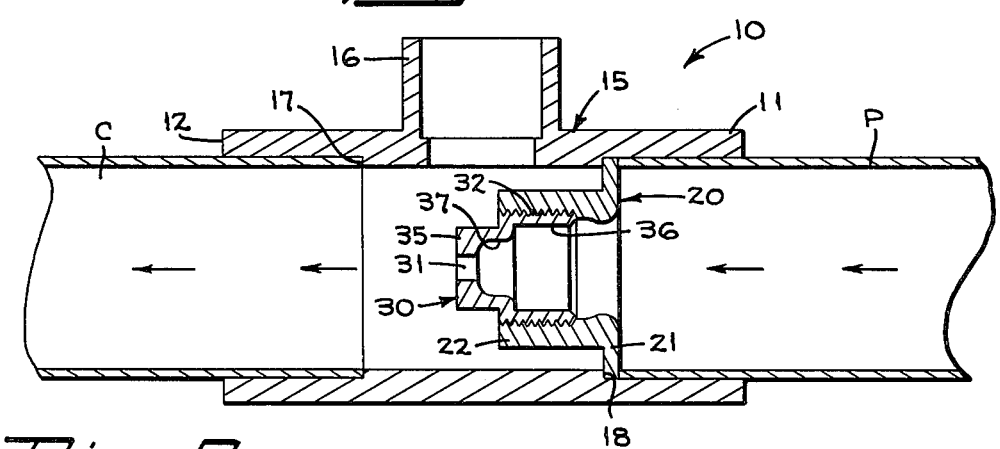
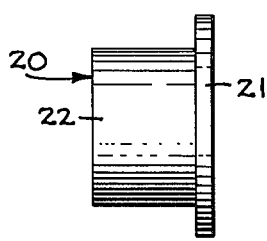
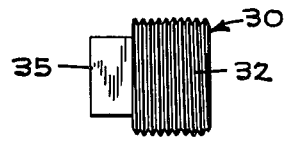
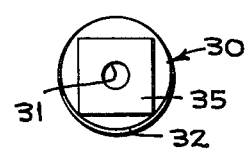
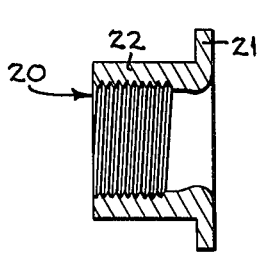
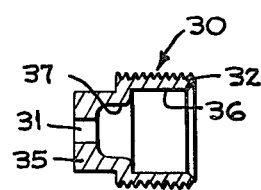
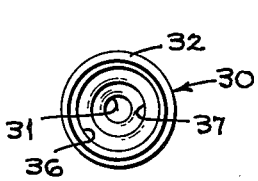

VENTURI FITTING FOR THE AERATION OF WATER

BACKGROUND OF THE INVENTION

The present invention relates in general to pipe fittings and more particularly to a fitting for the aeration of water in a pool recirculating system.

Heretofore, a Venturi T-fitting with an air inlet had been employed for connection with the inlet fitting for the recirculation of water in a pool. In such a fitting, the component, in which the discharge orifice located at the air inlet was formed, was either fixed to the Venturi T-fitting or else was removable only with additional components of the fitting to which it was fixed. As a consequence thereof, the replacement of the component to change the size of the discharge orifice was costly. Additionally, the fitting was rather cumbersome.

SUMMARY OF THE INVENTION

A fitting for the aeration of water in which water enters one end of a conduit. An air inlet in the conduit introduces air under pressure into the conduit to aerate the water. Fixedly disposed in the conduit is an adapter through which water advances. Removably attached to the adapter is an insert formed with a discharge orifice that is located in the vicinity of the air inlet.

By virtue of the present invention, the size of the discharge orifice is changed by removing the insert from the adapter and replacing it with an insert formed with a different size orifice. Thus, the size of the discharge orifice can be regulated economically with simple and inexpensive removable components.

A feature of the present invention is the nut-like projection of the insert for engagement with a wrench for attaching or removing the insert from the adapter.

DESCRIPTION OF THE DRAWINGS

FIG. 1 is an elevation view of a T-fitting embodying the present invention.

FIG. 2 is an axial sectional view of the T-fitting shown in FIG. 1 incorporating therein the present invention and illustrated with a recirculating pipe and an outlet fitting pipe.

FIG. 3 is an elevation view of an adapter employed in the present invention.

FIG. 4 is an axial sectional view of the adapter shown in FIG. 3.

FIG. 5 is an elevation view of an insert employed in the present invention.

FIG. 6 is a longitudinal sectional view of the insert shown in FIG. 5.

FIG. 7 is an outlet end view of the insert shown in FIGS. 5 and 6.

FIG. 8 is an inlet end view of the insert shown in FIGS. 5, 6 and 7.

DESCRIPTION OF THE PREFERRED EMBODIMENT

Illustrated in FIG. 1 is a fitting 10 which is connected at its inlet end 11 to the discharge end of a suitable water recirculating pipe P for a pool and its discharge end 12 to a suitable cylindrical pipe connector C for a nozzle inlet fitting. In applicant's copending application, Ser. No. 560,158, filed on Mar. 20, 1975, entitled "Inlet Fitting For Recirculation of Water In Pool", a suitable nozzle inlet fitting is disclosed in detail.

The fitting 10 is preferably made of a suitable plastic, such as PVC, and serves to aerate the water advancing from the recirculating pipe P to the pipe connector C of a nozzle inlet fitting. Toward this end, the fitting 10 comprises a cylindrical body 15. Integrally formed with the body 15 and communicating therewith is an air inlet connector 16. The air inlet connector 16 is radially disposed externally of the body 15 and, thus, the fitting 10 may be referred to as a T-fitting.

The air inlet connector 16 is connected to a suitable source of air under pressure, not shown, and the air under pressure mixes with the water passing through the body 15 to be aerated. Internally, the body 15 is provided with an annular flange 17 against which the pipe connector C of a nozzle inlet fitting abuts (FIG. 2). The pipe connector C is snugly received in a telescopic manner by the body 15 in a water-tight relation. A similar annular shoulder 18 is formed on the inner cylindrical wall of the body 15 against which an adapter 20 abuts. The annular shoulders 17 and 18 are on opposite sides of the air inlet connector 16.

The adapter 20 (FIGS. 2–4) is preferably made of plastic, such as PVC, and comprises an annular flange 21, which abuts against the annular shoulder 18. The flange 21 provides a water-tight fit with the inner wall of the body 15. Extending from the flange 21 toward the discharge end 12 of the body 15 is a cylindrical body 22 of the adapter 20. The cylindrical body 22 is internally threaded. In practice, the flange 21 is solvent welded to the inner wall of the body 15. The recirculating pipe P has the discharge end thereof abutting against the flange 21 of the adapter 20 in a water-tight relation. The recirculating pipe P has a water-tight fit in which the inner wall of the body 15 and the discharge end thereof, in practice, is solvent welded to the flange 21 of the adapter 20.

Detachably secured to the adapter 20 by threaded engagement therewith is an insert 30 (FIGS. 2 and 5–8), which is made of a suitable plastic, such as PVC. Formed in the insert 30 is an axially disposed discharge orifice 31. The size of the discharge orifice 31 controls the flow of water advancing toward the discharge end 12 of the body 15. Thus, by changing the diameter or size of the discharge orifice 31, the flow of gallons per unit of time through the fitting 10 is controlled.

The insert 30 is preferably made of a suitable plastic and comprises a cylindrical body 32, which is externally threaded. The body 32 of the insert 30 is detachably secured to the adapter 20 by threaded engagement with its internally threaded body 22. Integrally formed with the body 32 is a nut-shaped projection 35, which is directed toward the outlet end 12 of the body 15. Formed in the nut-like projection 35 is the axially disposed discharge orifice 31. Thus, a suitable wrench may be inserted into the discharge end of the body 15 for engagement with the nut-like projection 35 to either remove from or attach to the insert 30 to adapter 20.

The inlet end of the insert 30 is formed with a larger diameter opening 36. At the junction between the body 32 and the nut-like projection 35, the internal diameter 37 of the insert 30 is reduced and the insert 30 is further reduced in diameter at the discharge orifice 31. The discharge orifice 31 is generally located in the vicinity of the air inlet connector 16 and preferably in alignment with the axis thereof or at a location slightly toward the inlet end of the body 15 from the axis of the connector 16.

In operation, water advancing through the recirculation pipe P enters the body 15 of the T-fitting 10 and advances through the adapter 20. From the adapter 20, the water is discharged from the discharge orifice 31 of the insert 30 for continued flow through the fitting 10. Thereupon, the water is subjected to air under pressure flowing through the air inlet connector 16 to be aerated. Aerated water is discharged from the body 15 into the connector C of a nozzle inlet fitting. For varying the gallons per minute flow of water through the insert 30, the insert 30 may be removed and replaced with a similar insert with a different discharge orifice size or diameter. Toward this end, the connector C is removed from the body 15 and a wrench is inserted into the discharge end of the body 15 for engagement with the nut-like projection 35 of the insert 30.

I claim:

1. A fitting for aerating water comprising:
   (a) means for conducting water from a source;
   (b) a conduit through which water flow communicating with said means for the passage of water thereinto, said conduit being formed with an air inlet for introducing air under pressure into said conduit for aerating the water flowing therethrough;
   (c) an adapter disposed in said conduit in fixed relation thereto and forming a passage in said conduit through which water flowing in said conduit is conducted; and
   (d) an insert removably secured to said adapter and disposed within said conduit, said insert being formed with a discharge orifice, said insert being arranged to provide a passage for the flow of water advancing through said adapter for discharge through said discharge orifice within said conduit, the diameter of the passage provided by said insert for the flow of water advancing through said adapter being lesser than the diameter of the passage formed by said adapter through which water is conducted, said insert being formed with a nut-like projection directed in the direction of flow of said water through said conduit,
   (e) said adapter including an outer wall fixed to an inner wall of said conduit in water-tight relation and an internally threaded cylindrical wall, said insert being formed with an externally threaded cylindrical wall for threaded engagement with said internally threaded wall of said adapter, said nut-like projection of said insert projecting from said threaded wall of said insert, said discharge orifice being formed in said nut-like projection.

2. A fitting as claimed in claim 1 wherein said conduit is formed with an annular shoulder on the inner wall thereof against which said adapter abuts.

3. A fitting as claimed in claim 2 wherein said adapter is formed with an annular flange which abuts against the annular shoulder of said conduit.

4. A fitting as claimed in claim 3 wherein said discharge orifice is disposed in said conduit in the vicinity of said air inlet.

5. In a fitting for aerating water,
   (a) means for conducting water from a source;
   (b) an adapter through which water flows communicating with said means for the passage of water thereinto, said adapter being formed with an internally threaded wall, said adapter being formed with a passage for conducting water therethrough; and
   (c) an insert formed with a discharge orifice and an externally threaded wall, said externally threaded wall of said insert being in threaded engagement with said internally threaded wall of said adapter for removably securing said insert to said adapter, said insert providing a passage for the flow of water advancing through said adapter for discharge through said discharge orifice, the diameter of the passage provided by said insert for the flow of water advancing through said adapter being lesser than the diameter of the passage formed by said adapter through which water is conducted, said insert being formed with a nut-like projection projecting from said threaded wall of said insert outwardly from said adapter, said discharge orifice being formed in said nut-like projection.

* * * * *